(12) United States Patent
Ferguson et al.

(10) Patent No.: US 7,496,416 B2
(45) Date of Patent: Feb. 24, 2009

(54) INPUT/OUTPUT CURVE EDITOR

(75) Inventors: Stuart Harl Ferguson, Sunnyvale, CA (US); Mark Brown, Banbury (GB)

(73) Assignee: Luxology, LLC, San Mateo, CA (US)

( * ) Notice: Subject to any disclaimer, the term of this patent is extended or adjusted under 35 U.S.C. 154(b) by 293 days.

(21) Appl. No.: 11/484,064

(22) Filed: Jul. 11, 2006

(65) Prior Publication Data

US 2007/0093913 A1 Apr. 26, 2007

Related U.S. Application Data

(60) Provisional application No. 60/704,695, filed on Aug. 1, 2005.

(51) Int. Cl.
*G05B 15/00* (2006.01)
*G06T 13/00* (2006.01)
*G06T 15/70* (2006.01)

(52) U.S. Cl. .................. 700/83; 345/442; 345/473; 345/949; 352/87

(58) Field of Classification Search ............ 700/83, 700/96–98; 345/441–443, 473–475, 649, 345/654, 660, 665, 672, 680, 949–955; 352/87
See application file for complete search history.

(56) References Cited

U.S. PATENT DOCUMENTS

| 4,797,836 | A | * | 1/1989 | Witek et al. ............ 345/473 |
|---|---|---|---|---|
| 5,197,013 | A | | 3/1993 | Dundorf |
| 6,154,221 | A | | 11/2000 | Gangnet |
| 6,469,702 | B1 | * | 10/2002 | Sheasby et al. .......... 345/442 |
| 7,196,707 | B2 | * | 3/2007 | Davignon ............... 345/442 |
| 7,218,326 | B1 | * | 5/2007 | Bogues et al. .......... 345/442 |
| 7,236,167 | B2 | * | 6/2007 | Lee et al. .............. 345/420 |
| 2002/0036639 | A1 | * | 3/2002 | Bourges-Sevenier ..... 345/474 |
| 2004/0095352 | A1 | * | 5/2004 | Huang ................... 345/473 |
| 2006/0055700 | A1 | * | 3/2006 | Niles et al. ............ 345/473 |
| 2006/0192783 | A1 | * | 8/2006 | Kass et al. ............. 345/473 |
| 2006/0214935 | A1 | * | 9/2006 | Boyd et al. ............ 345/473 |

OTHER PUBLICATIONS

PCT International Search Report, Feb. 6, 2008.
"Using the Graph Editor Menu Bar", Feb. 20, 2001, p. 7,12 http://web.archive.org/web/20010220152516/http://caad.arch.ethz.ch/info/maya/manual/UserGuide/Animation/KeyframeMoPath/04_graph_editor.doc1.html.
Robert Ellis, et al., "Calculus with Analytic Geometry", p. 18-32, Figure 1.24 (p. 27), Fig. 1.27 (p. 29).

* cited by examiner

*Primary Examiner*—M. N. Von Buhr
(74) *Attorney, Agent, or Firm*—Gordon & Rees, LLP

(57) ABSTRACT

A method of varying the relationship between a scalar input parameter and a scalar output parameter, by: displaying a relationship between an input parameter and an output parameter as a curve on a computer screen; selecting at least one control point on the curve; and moving at least one handle associated to the at least one control point to vary the shape of the curve as the curve passes through the at least one control point, thereby varying the relationship between the input parameter and the output parameter.

22 Claims, 13 Drawing Sheets

INPUT/OUTPUT CURVE EDITOR

RELATED APPLICATION

The present application claims priority under 35 U.S.C. Section 119 to U.S. Provisional patent application 60/704,695, entitled "Animation Software", filed Aug. 1, 2005.

TECHNICAL FIELD

The present invention relates to computer animation software.

BACKGROUND OF THE INVENTION

Creating computer animation displays involves constantly changing scenes and constantly changing relationships between objects in the 3D scene database. Therefore, when designing various computer animations, software systems are required that permit a user to specify the behavior of one variable (e.g.: an "output" variable) in relation to another variable (e.g.: an "input" variable). The input and output variables may also be called the "independent" and "dependent" parameters, respectively.

For example, a computer animator may desire the "light intensity" of an object to change over time such that the object in the animation becomes brighter or darker over time. In this particular case, "time" would be the input variable, and "brightness" would be the output variable. It is required in computer animation that various properties (e.g.: "brightness", "height", "strength of a force", etc.) change over time. What is needed is computer software systems that permit an animator to quickly and easily set up (i.e.: create and edit) the relationship between a scalar input parameter (including, but not limited to "time") and a scalar output parameter (including, but not limited to "brightness", "height", "strength of a force", etc.).

As stated above, computer animators typically set up relationships between time (as the input parameter) and some other scalar output parameter (e.g.: brightness, height, strength of force, etc). However, it is to be understood that it is not always desirable to use "time" as the input parameter. It may instead be more desirable to use a different input parameter. For example, it may be desirable to define movement in the limb of an animated character by defining movement of one part of the limb (e.g.: the lower part of the leg) with respect to the position of another part of the limb (e.g.: the upper part of the leg). In this example, it would be easy for the animator to visualize and set up the movement of the limb.

Unfortunately, existing software animation programs lack sufficient flexibility. This is due to the fact that relationships between input and output variables in standard animation curves are generally defined as one-dimensional piecewise smooth cubics, with each segment of the curve having the form:

$$F(t) = a_0 + a_1 t + a_2 t^2 + a_3 t^3$$

Segments of such curves can be defined on a 2D plot which gives key values for the curve at specified times. The shape of the interpolating curve (i.e.: the curve between the key values) can be determined by various techniques including B-Splines, NURBS, slope handles with one degree of freedom, or by composite controls which indirectly control the free parameters of the cubic. Such systems offer limited flexibility and each has properties that make them non-intuitive for animators. For example, B-splines use piecewise cubics to solve intermediate values between their control points. Unfortunately, it is difficult to control how such line segments interpolate because such B-spline curves do not always pass exactly through the control points. This makes these systems somewhat more difficult for an animator to operate than the more familiar Bezier splines with control points and handles with two degrees of freedom employed by most 2D drawing programs.

Therefore, the need exists for a software system that permits a user to easily set up (i.e.: create and edit) the relationship between any input parameter and any output parameter.

In addition, the need exists for the animator to be able to select the value of an output parameter at certain input parameter values, and have the software interpolate the output values therebetween. For example, the animator may wish to set various brightness levels for an on screen object at certain time intervals (e.g.: at 1 second, 5 seconds, etc.) and have the software automatically calculate (and continuously display) the on screen brightness of the object as it varies over time.

In addition, existing systems allow animators to set up input/output relationships and provide interpolation of values between on screen control points. However, it has not yet been possible to provide a control point handle that has two degrees of freedom.

SUMMARY OF THE INVENTION

The present invention provides a method of varying the relationship between a scalar input parameter and a scalar output parameter, by: displaying a relationship between an input parameter and an output parameter as a curve on a computer screen; selecting at least one control point on the curve; and moving at least one handle associated to the at least one control point to vary the shape of the curve as the curve passes through the at least one control point, thereby varying the relationship between the input parameter and the output parameter, wherein each handle has at least two degrees of freedom.

As a result, the computer animator is able to see the relationship between an input parameter and an output parameter as a curve displayed on screen. Typically, the input parameter (which may optionally be "time") is displayed on a horizontal axis and the output parameter is displayed on a vertical axis. In accordance with the on-screen editing features of the present invention, the user is then able to "grab onto" this curve and easily vary its shape on the computer screen. As a result, the animator can easily change the relationship between the input and output parameters. Specifically, the animator can select "control points" on the curve, and then change the shape of the curve by moving "handles" associated with these control points.

In various aspects, each control point has two handles that are positioned on a line segment passing through the control point on a tangent to the curve. These handles can be moved in two dimensions on the computer screen. Moving the handles varies the angle and shape of the curve passing through the control point.

In certain aspects of the invention, moving one handle causes the other handle to move such that the two handles remain positioned on a line segment passing through the control point on a tangent to the curve. Moving the handles along the tangent to the curve varies the shape of the curve approaching the control point. In other aspects of the invention, the position of each of the two handles on either side of the input parameter value can be adjusted independently.

In further optional aspects of the invention, the handles can be moved independently to break the slope of the curve at an input parameter value.

In further optional aspects of the invention, the value of the curve at an input parameter value can be broken such that the animator can set two different values of the curve at the input parameter value where the curve has been broken.

The present invention also provides a method of varying the relationship between an input parameter and an output parameter, by: displaying a relationship between a scalar input parameter and a scalar output parameter as a curve on a computer screen; selecting at least one control point on the curve; and moving at least one handle associated to the at least one control point to vary the shape of the curve as the curve passes through the at least one control point, thereby varying the relationship between the input parameter and the output parameter, wherein the curve being displayed on the computer screen is constrained such that it can not loop over on top of itself.

This further feature of the invention proves that the curve is calculated such that there is only one output parameter value for each input parameter value (IE: the curve is constrained such that it does not loop over on top of itself). This feature is particularly advantageous in that multiple solutions to a problem do not occur. For example, a curve representing the position or brightness of an on screen object at different times only has one value at each time (i.e.: there is only one output value for each time input value). In accordance with aspects of the present invention, this is accomplished by calculating the curve as a pair of cubic equations with independently constrained coefficients. In optional embodiments, where the input/output relationship is defined by the animator as a step function, the animator may be given the choice of selecting one of the two possible output variables for the particular input variable.

BRIEF DESCRIPTION OF THE DRAWINGS

FIG. 1 shows an initial position of the input/output curve.

FIGS. 2 to 6 show sequential steps of an animator varying the shape of the curve.

FIGS. 7 and 8 show the slope of the curve being broken at a control point.

FIGS. 9 and 10 show the weight of the handles being broken at a control point.

FIGS. 11 to 13 show the value of the curve being broken at a control point.

DETAILED DESCRIPTION OF THE DRAWINGS

The present invention provides an animation software curve editor for easily and quickly adjusting the shape of a curve defining the relationship between a scalar input parameter and a scalar output parameter. In an exemplary aspect of the invention, the input parameter can be "time". It is to be understood, however, that the present invention is not so limited. In various exemplary aspects of the invention, the output parameter could also be "brightness", "height", "strength of a force", etc. It is also to be understood that the present invention is not limited to any particular set of output parameters. Rather, such output (and input) parameters can be selected by the computer animator as desired.

In a preferred aspect of the invention, the present system provides a method of varying the relationship between a scalar input parameter and a scalar output parameter, by: displaying a relationship between an input parameter and an output parameter as a curve on a computer screen; selecting at least one control point on the curve; and moving at least one handle associated to the at least one control point to vary the shape of the curve as the curve passes through the at least one control point, thereby varying the relationship between the input parameter and the output parameter.

Figure 1:
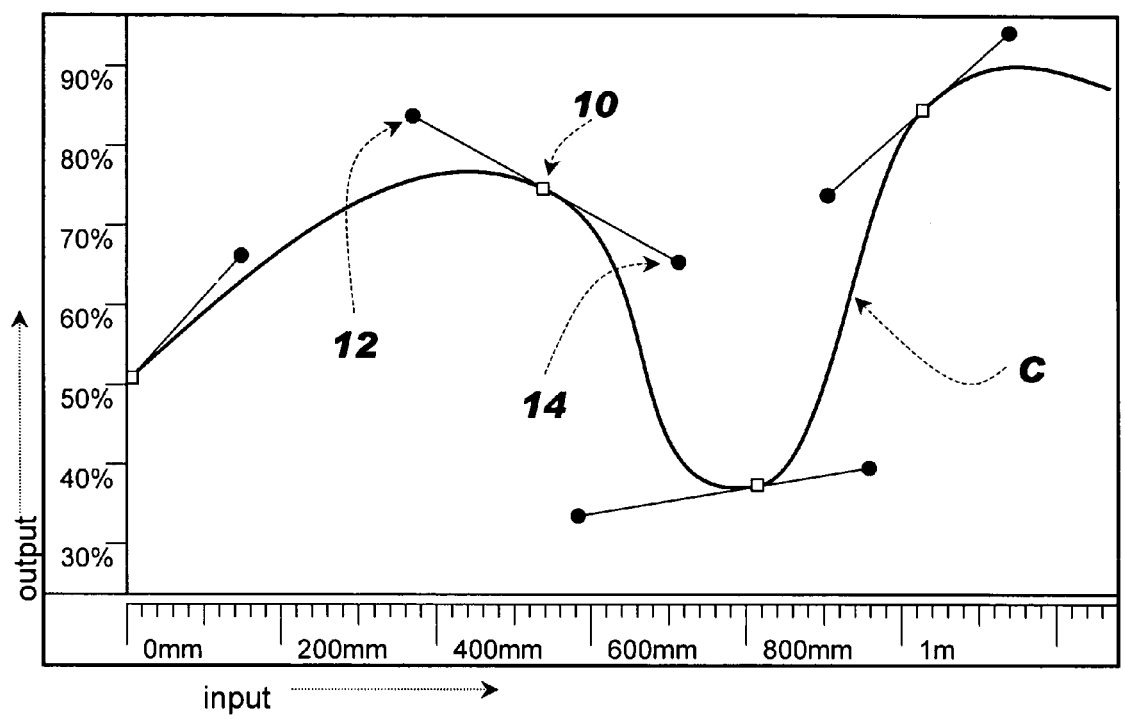
FIGS. 1 to 13 are screenshots of the present invention illustrating an operator changing the shape and other features of the input/output curve over time, as follows.

This is seen in FIGS. 1 to 13 as follows:

In FIG. 1, an input/output curve C is illustrated. The input value is illustrated along the horizontal axis and the output value is illustrated along the vertical axis. In this particular example, "distance" is the input value and "gradient percentage" is the output value that has been selected by the computer animator. For example, at a distance of 0 mm, the gradient is 50%, and at a distance of 800 mm, the gradient is about 38%.

In accordance with the present invention, an animator may move this curve by selecting one or more control points such as control point 10. Each control point has two handles associated therewith. For example, control point 10 has handles 12 and 14 associated therewith. The user can vary the shape of curve C by either moving control point 10, or by moving handles 12 and 14 in two dimensions (up or down and left or right) on the computer screen.

Figure 2:
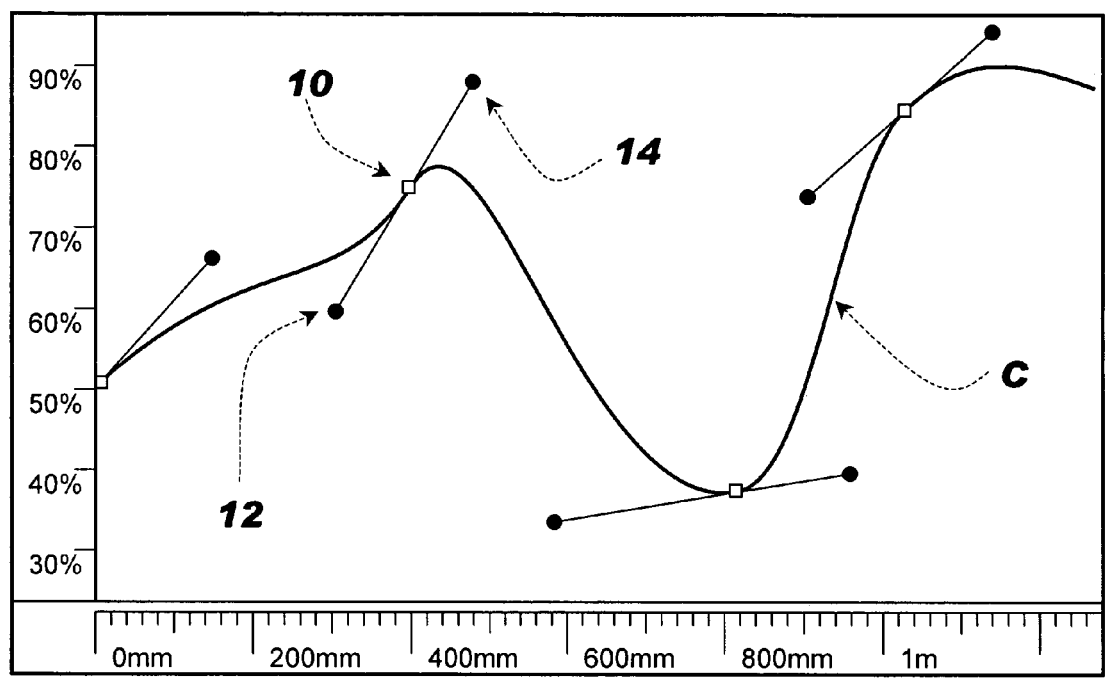

For example, the animator can move control point 10 and handles 12 and 14 to the positions shown in FIG. 2. As can be seen, handles 12 and 14 are positioned on a line segment passing through control point 10 on a tangent to curve C. Typically, moving one handle 12 causes the other handle 14 to move such that the two handles 12 and 14 lie on a line segment passing through control point 10 on a tangent to curve C.

Figure 3:
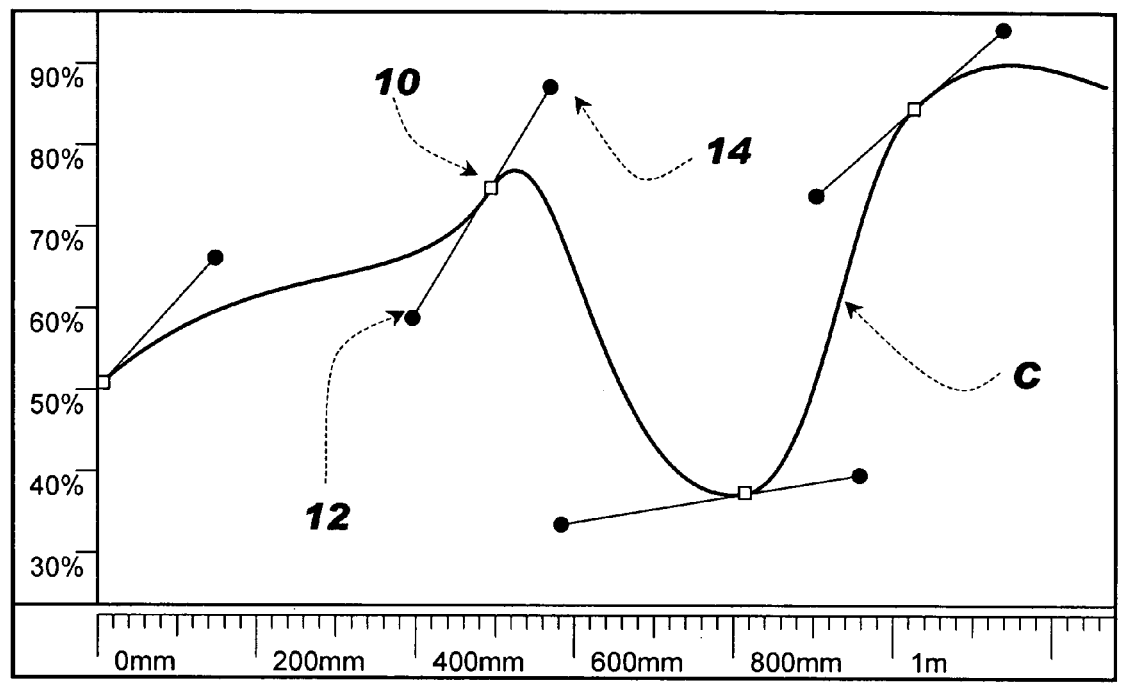
Figure 4:
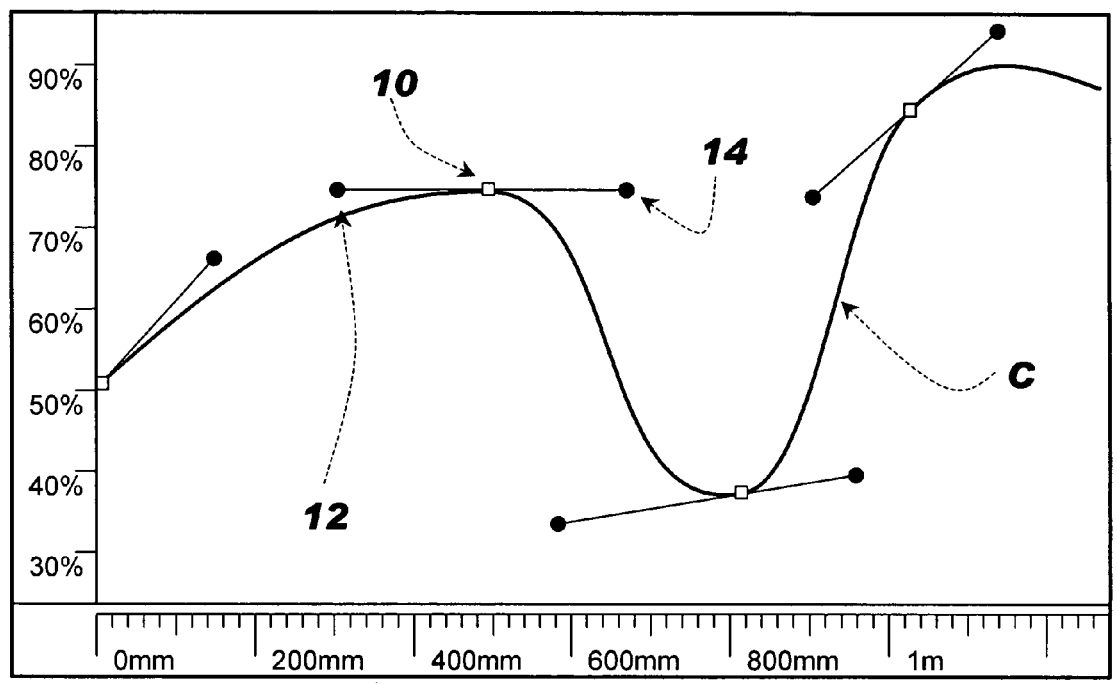

Next, the animator may desire only to move control point 10 from the position shown in FIG. 2 to the position shown in FIG. 3. As can be seen, handles 12 and 14 simply follow along when control point 10 is moved.

Next, the animator may desire to vary the angle of the curve passing through control point 10. This can be accomplished by varying the position of handles 12 and 14. For example, the animator may move handles 12 and 14 from the position shown in FIG. 3 to the position shown in FIG. 4. As can be seen, the shape of the curve through control point 10 is varied accordingly.

Figure 5:
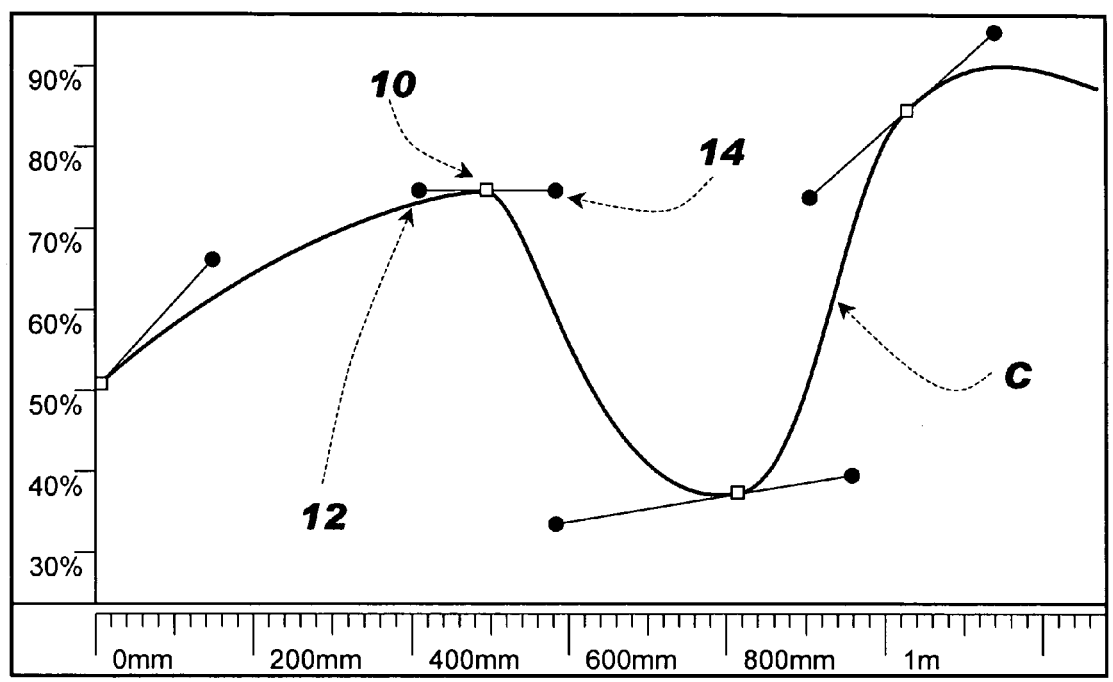
Figure 6:
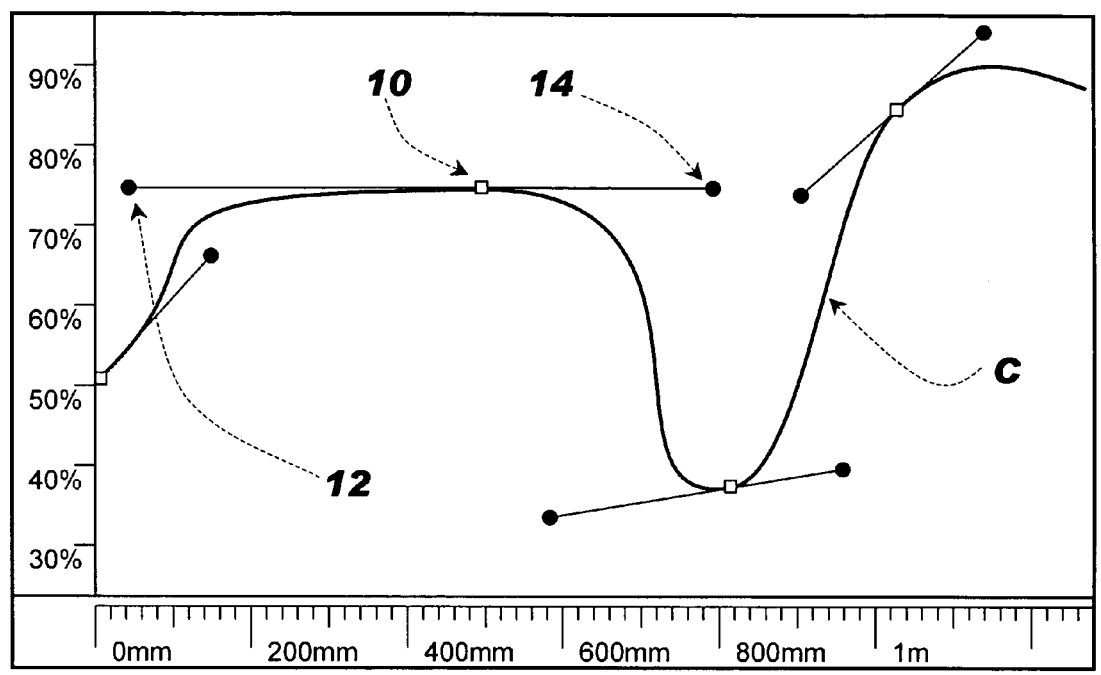

Next, the animator may desire to vary the shape of the curve approaching the control point 10. This can be accomplished by varying the position of handles 12 and 14 by moving them along the tangent to curve C. For example, the animator may vary the shape of the curve approaching the control point 10 by moving handles 12 and 14 closer to control point 10 (as seen in FIG. 5) or by moving handles 12 and 14 farther from control point 10 (as seen in FIG. 6). This novel aspect of the present invention allows the animator to adjust the width of the "plateau" around the key value at control point 10 without altering the slope of the curve at that control point. Effectively this controls the weight of control point 10 in a manner that is familiar for users of 2D drawing programs.

An interesting and advantageous property of the present invention can be seen in FIG. 6. Specifically, the curve defines a single-valued function of the independent parameter—there is only one output parameter value for each input parameter value. In other words, curve C does not loop over on top of itself regardless of how far handles 12 and 14 are moved away from control point 10. Specifically, as can be seen for input values in the range of about 680 mm to 720 mm, curve C gets close to vertical but does not loop back over on top of itself. This is accomplished by calculating curve C as a pair of constrained cubic equations with independently constrained coefficients, as will be explained fully below.

Figure 7:
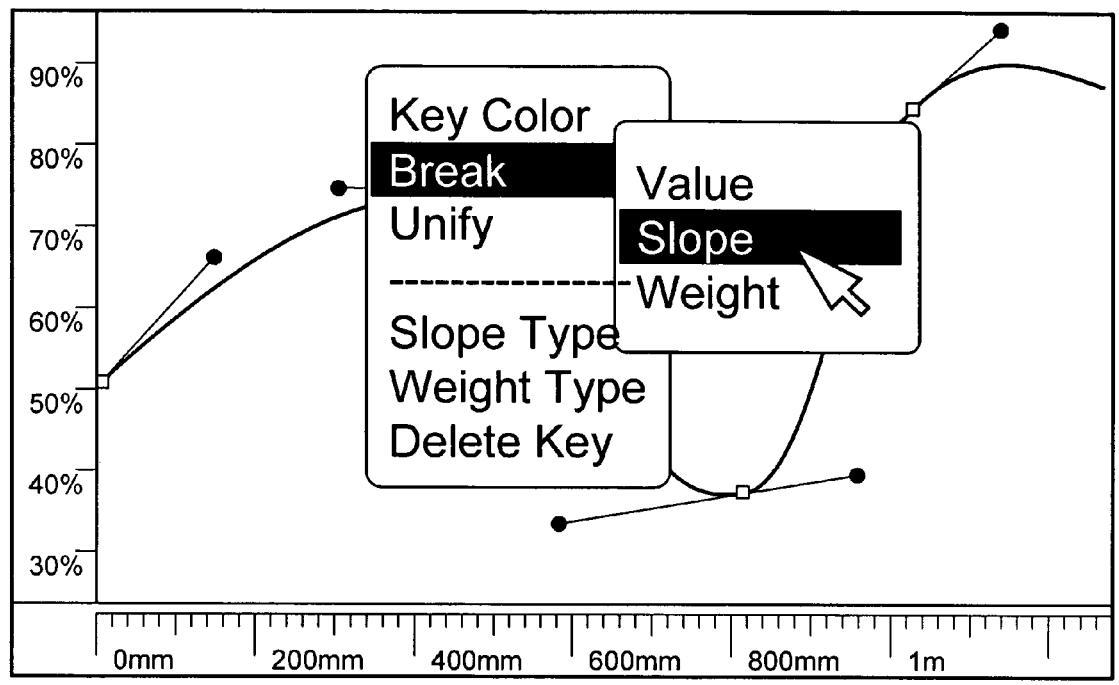
Figure 8:
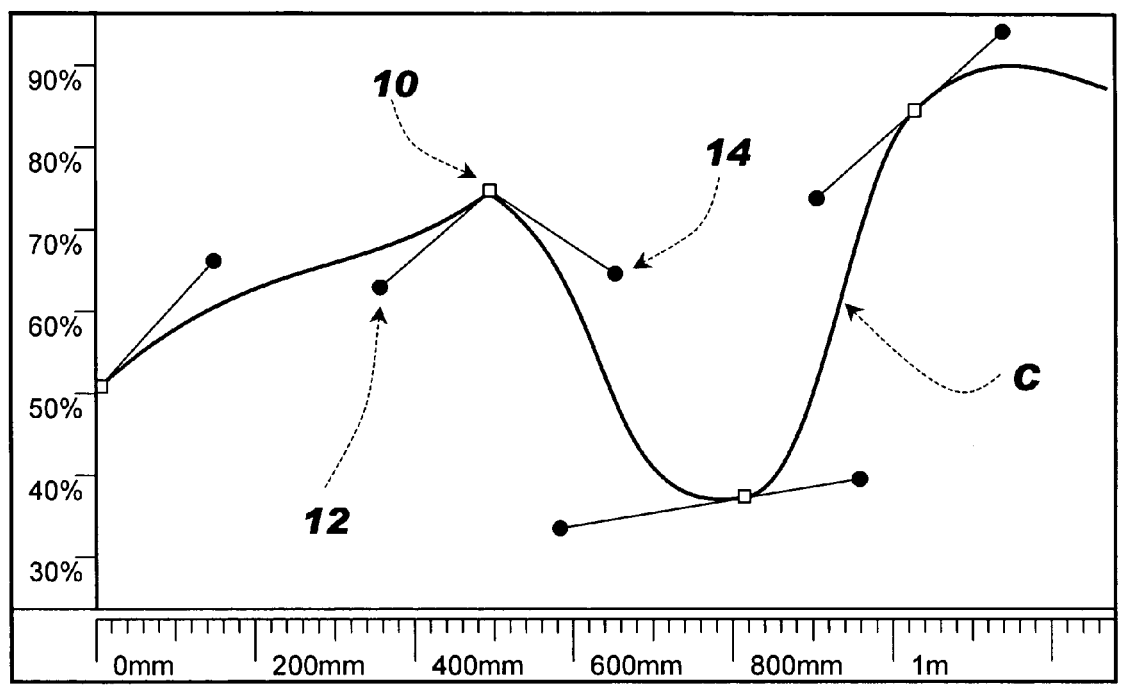

FIGS. 7 and 8 illustrate the optional feature of breaking the slope of the curve at a control point, as follows. FIG. 7 shows a screen shot of the animator selecting to break the slope of curve C. FIG. 8 shows a screen shot after the slope of curve C has been broken at control point 10 (i.e.: at an input value of about 480 mm). Specifically, after the slope of curve C has been broken, handles 12 and 14 are moved to the positions shown. As can be seen, the position of handle 12 varies the slope of curve C to the left of control point 10 (i.e.: for input values less than 480 mm), and the position of handle 14 varies the slope of curve C to the right of control point 10 (i.e.: for input values more than 480 mm). As seen in FIG. 8, the weight at control point 10 by each of handles 12 and 14—i.e.: the distance between each of handles 12 and 14 and control point 10 and thus the width of the plateau—is the same on each side.

Figure 9:
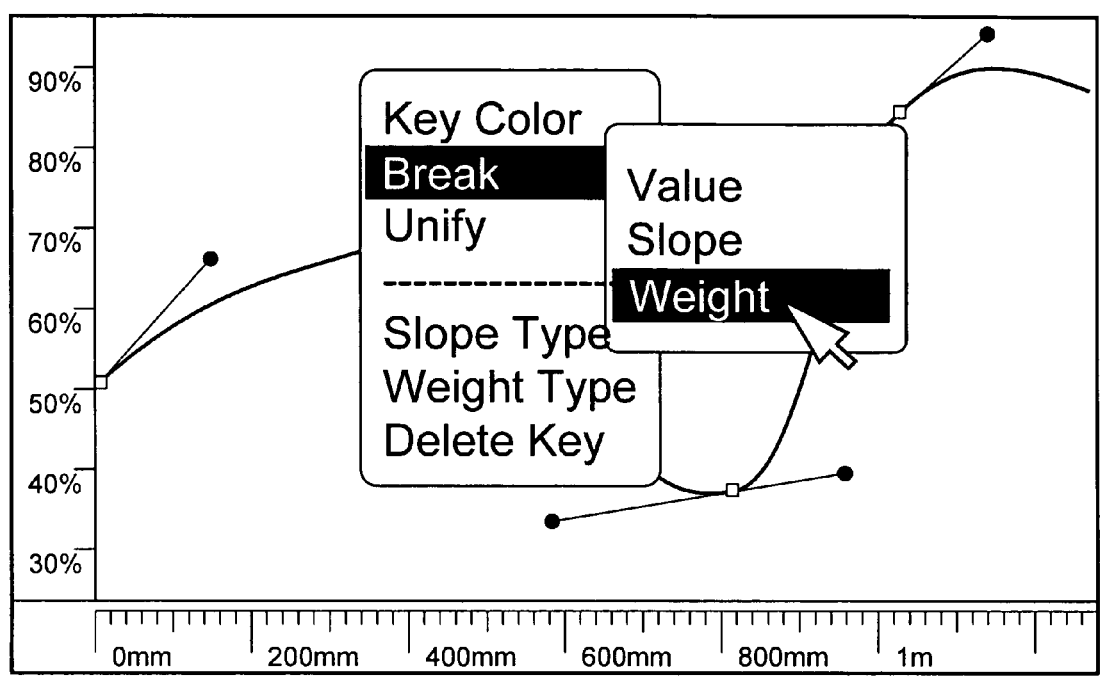
Figure 10:
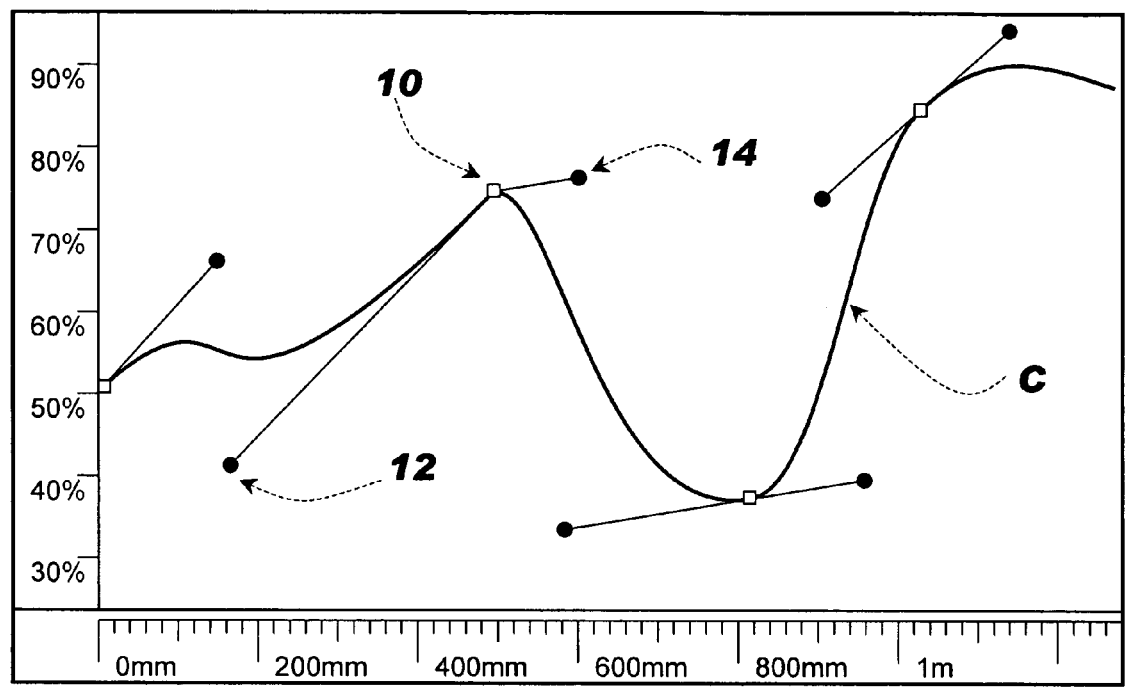

Next, as seen in FIGS. 9 and 10, the animator may optionally break the weight of the handles 12 and 14 on either side of the control point, as follows. FIG. 9 shows a screen shot of the animator selecting to break the weight of handles 12 and 14 on the slope of curve C at control point 10. FIG. 10 shows a screen shot after the weight of handles 12 and 14 upon the slope of curve C has been broken at control point 10 (i.e.: at an input value of about 480 mm). Specifically, after the weight of each of handles 12 and 14 has been broken, handles 12 and 14 are moved to the positions shown. As can be seen, the position of handle 12 varies the slope and weight of curve C to the left of control point 10 (i.e.: for input values less than 480 mm), and the position of handle 14 varies the slope and weight of curve C to the right of control point 10 (i.e.: for input values more than 480 mm). The distance between each of handles 12 and 14 and control point 10 is now different. In particular, handle 12 is now somewhat farther away from control point 10 than is handle 14. Thus, handle 12 will exert more weight on the slope of curve C as it passes through control point 10 than will handle 14.

Figure 11:
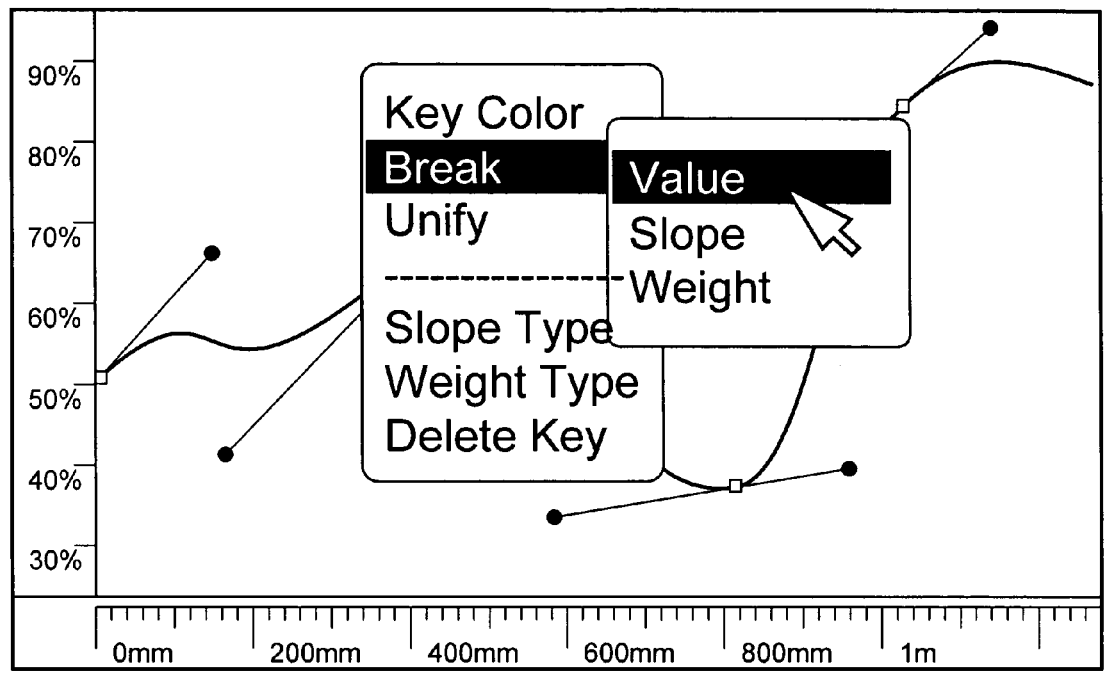
Figure 12:
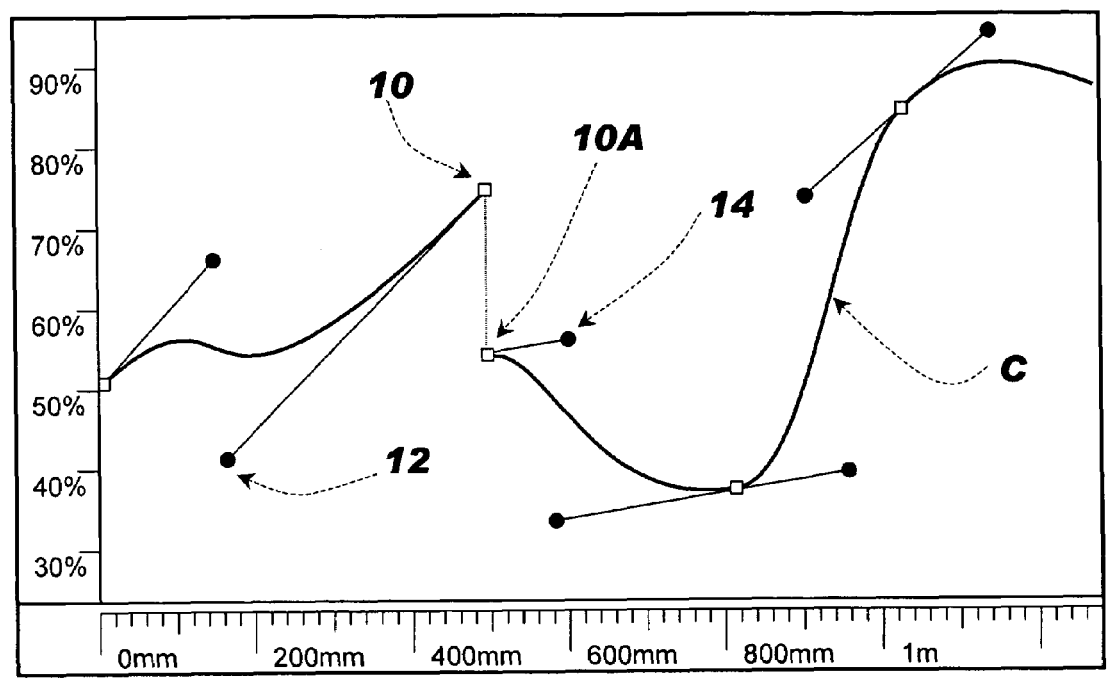
Figure 13:
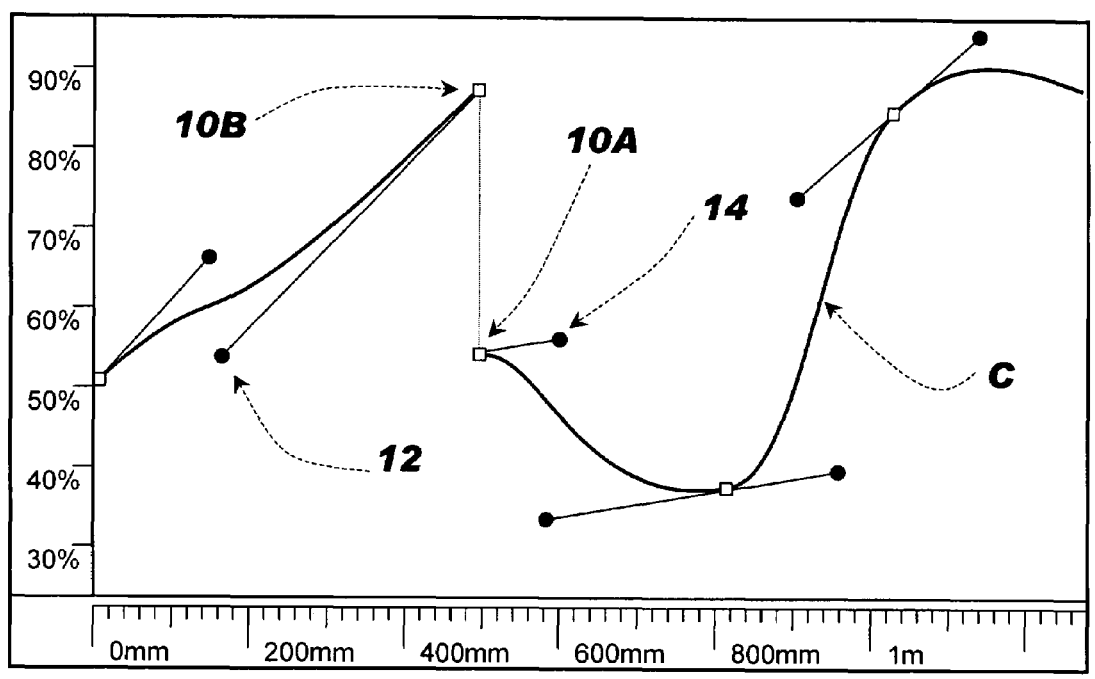

Next, as seen in FIGS. 11 and 12, the animator may optionally break the value of control point 10 at a selected input parameter value (e.g.: at about 480 mm). FIG. 11 shows a screen shot of the animator selecting to break the value of control point 10. FIG. 12 shows a screen shot after the animator has split control point 10 and moved half of the control point 10 downwardly to location 10A. Next, as shown in FIG. 13, the animator may then move the other half of control point 10 upwardly to location 10B. As a result, the output parameter will exhibit a step-function at an input parameter value of about 480 mm. For example, when the input parameter is 400 mm, the output parameter (e.g.: gradient) is about 50%. However, when the input parameter is 440 mm, the output parameter (e.g.: gradient) jumps immediately to about 87%. This feature of the invention is particularly useful when designing animations having instantaneous changes in their properties, such as a light turning on or off or camera cutting from one part of a scene to another. In optional embodiments, where the input/output relationship is defined by the animator as a step function, the animator may be given the choice of selecting one of the two possible output variables for the particular input variable. For example, the animator may select the gradient to be either 50% or 87% when the input parameter is exactly 480 mm.

In accordance with the present invention, curve C is calculated as a pair of cubic equations with independently constrained coefficients. For example, the value of curve C at an input parameter (e.g.: "t") is determined by first computing the intermediate value of "s" as a function of "t", and then the final value of "F" as a function of "t", as follows:

$$s(t)=b_0(1-t)^3+b_1(1-t)^2t+b_2(1-t)t^2+b_3t^3$$

$$F(s)=a_0+a_1s+a_2s^2+a_3s^3$$

The coefficients $a_n$ are the same as set forth in the equation in the Background section (above) describing pre-existing software systems, with the key values for curve C set at s=0 and s=1 along the slope at those points. The s(t) function remaps the 0 to 1 range of "t" into the 0 to 1 range of "s".

With $b_0$ set to 0 and $b_3$ set to 1, the endpoints of function s(t) are constrained. Thus, $b_1$ and $b_2$ control the shape of the intermediate curve and correspond to the weights of each control point 10.

Substituting control point weights w0 and w1 for $b_1$ and $b_2$ respectively results in:

$$s(t)=w_0(1-t)^2t+(1-w_1)(1-t)t^2+t^3$$

As a result, when curve C is displayed on screen, each of handles 12 and 14 have two degrees of freedom, and can thus be moved in two dimensions (up or down and left or right) on the computer screen.

In one optional embodiment of the present invention, the default weights for $w_0$ and $w_1$ are both 1/3. This makes s(t) an identity relation. As a result, the curve C starts out as a simple cubic, and then the user can change the weights to affect the shape of curve C.

In preferred embodiments, as the animator manipulates curve handles 12 and 14, the present system can be set to ensure that the following constraints are maintained:

$$w_0+w_1<2$$

$$|w_0-w_1|<4/3$$

By assuring that the sum of $w_0+w_1$ is less than 2 and three times the absolute value of the difference is less than 4, s(t) is assured to be monotonically increasing. This prevents function s(t) from indexing the same part of the F(s) function twice. As a result, when curve C is displayed on the computer screen, it is constrained such that it does not loop over on top of itself.

What is claimed is:

1. A method of varying the relationship between an input parameter and an output parameter, comprising:
   displaying a relationship between a scalar input parameter and a scalar output parameter as a curve on a computer screen;
   selecting a control point on the curve;
   breaking the value of the control point; and
   altering the value of the curve on at least one side of the broken control point, thereby varying the relationship between the input parameter and the output parameter as a step-function at the broken control point.

2. The method of claim 1, further comprising:
   breaking the slope of the curve at the bottom control point.

3. The method of claim 2, further comprising:
   setting two different slope values of the curve on opposite sides of the broken control point.

4. The method of claim 3, wherein setting two different slope values of the curve on opposite sides of the broken control point comprises:
   independently adjusting the position of each of the two handles on either side of the broken control point.

5. The method of claim 4, further comprising:
   moving the two handles to different distances from the broken control point, thereby breaking the weight of the two handles on the slope on either side of the broken control point.

6. The method of claim 1, wherein the input parameter is displayed on a horizontal axis and the output parameter is displayed on a vertical axis.

7. The method of claim 6, wherein the input parameter is time.

8. The method of claim 1, wherein there is only one output parameter value for each input parameter value such that the curve being displayed on the computer screen does not loop over on top of itself.

9. The method of claim 1, wherein the curve is calculated by a pair of cubics with independently constrained coefficients.

10. The method of claim 1, wherein breaking the value of the control point comprises forming a broken control point having an upper value and a lower value.

11. The method of claim 10, further comprising varying the shape of the curve at the upper value of the broken control point.

12. The method of claim 10, further comprising varying the shape of the curve at the lower value of the broken control point.

13. The method of claim 1, wherein breaking the control point comprises moving one half of the broken control point up or down.

14. The method of claim 1, further comprising:
    moving at least one handle associated to the at least one broken control point to vary the shape of the curve as the curve passes through the broken control point.

15. The method of claim 14, wherein the at least one handle has at least two degrees of freedom.

16. The method of claim 14, wherein the weight of the at least one handle on the shape of the curve depends on a distance between the at least one handle and the broken control point.

17. The method of claim 14, wherein moving at least one handle associated to the broken control point comprises:
    moving the at least one handle in two dimensions on the computer screen.

18. The method of claim 17, wherein prior to the breaking the control point, the control point has two handles disposed on a line segment passing through the control point on a tangent to the curve.

19. The method of claim 18, wherein moving one handle causes the other handle to move such that the two handles remain disposed on a line segment passing through the control point on a tangent to the curve.

20. The method of claim 19, wherein moving the two handles varies the slope of the curve at the control point.

21. The method of claim 18, further comprising:
    moving one handle along the tangent to the curve, thereby varying the weight of the handle on the curve.

22. The method of claim 21, wherein moving one handle along the tangent to the curve varies the shape of the curve approaching the control point.

* * * * *